United States Patent [19]

Taniguchi et al.

[11] Patent Number: 4,935,920
[45] Date of Patent: Jun. 19, 1990

[54] DROP/INSERT PROCESSING CIRCUIT

[75] Inventors: Atsuki Taniguchi; Tomoyuki Ohtsuka, both of Kawasaki; Hidetoshi Naitou, Yokohama; Ryuichi Kondo, Kawasaki, all of Japan

[73] Assignee: Fujitsu Limited, Kawasaki, Japan

[21] Appl. No.: 238,046

[22] Filed: Aug. 30, 1988

[30] Foreign Application Priority Data

Aug. 31, 1987 [JP] Japan .................................. 62-215095

[51] Int. Cl.$^5$ ............................................... H04J 3/08
[52] U.S. Cl. ..................................... 370/55; 370/85.15
[58] Field of Search ............... 370/4, 55, 86, 85, 85.15

[56] References Cited

U.S. PATENT DOCUMENTS 3,665,405 5/1972 Sanders et al. ........................ 370/55
3,748,393 7/1973 Baxter .................................... 370/55

Primary Examiner—Douglas W. Olms
Assistant Examiner—Melvin Marcelo
Attorney, Agent, or Firm—Staas & Halsey

[57] ABSTRACT

Disclosed is a drop/insert processing circuit connected to, for example, a broadband subscriber network including a high speed data loop. The circuit is formed in one body comprising a single shift register, a single clock signal generator, a low speed data insertion control circuit, and a low speed data dropping circuit, whereby the circuit scale is reduced and the control is simplified.

15 Claims, 11 Drawing Sheets

DIRECT TYPE DROP/INSERT CIRCUIT

DROP/INSERT PROCESSING CIRCUIT

BACKGROUND OF THE INVENTION

1. Field of the Invention

The present invention relates to a drop/insert processing circuit in a broadband subscriber network.

As a broadband subscriber network, a synchronous optical network (SONET) has been developed in which a broadband subscriber loop system based on a single-mode fiber is employed, and high speed data is run through the loop. Terminal units dealing with low speed data are connected to the broadband subscriber loop, and therefore, drop/insert processing circuits must be connected between the high speed data loop and the low speed data terminal units, for dropping data from the loop or for inserting data into the loop.

The circuit scale of the drop/insert processing circuit, however, is too large and must be reduced, and the control of the drop/insert processing must be simplified.

2. Description of the Related Art

As a prior art of the present invention, a paper entitled "SONET" by Rodney J. Boehm, Yan-Chau Ching, and Rand C. Sherman, Bell Communications Research, Navisink Research Engineering Center, 331 Newman Springs Rd., CH 2190-7/85/0000-1443$1.00 1985 IEEE, describes a multiplexing and demultiplexing technology.

The above prior art and other conventional drop/insert processing circuits have the above-mentioned disadvantage of a large circuit scale, because the dropping circuit and the inserting circuit are separately provided as described in more detail with reference to the drawings, or have the above-mentioned disadvantage of a complex control.

SUMMARY OF THE INVENTION

An object of the present invention is to reduce the circuit scale of a drop/insert processing circuit and to simplify the control of the drop/insert processing.

To attain the above object, there is provided, according to the present invention, a drop/insert processing circuit for dropping a low speed data from a high speed data or inserting a low speed data into a high speed data. The high speed data has a frame consisting of a plurality of channels, each channel being synchronous with a high-frequency clock signal. The drop/insert processing circuit comprises a clock signal generating circuit for dividing the high-frequency clock signal into a low-frequency clock signal; a shift register for serially receiving and shifting the high speed data in response to the high-frequency clock signal; low speed data insertion control circuits for inserting, in response to the low-frequency clock signal and a data insertion control signal, the low speed data into a channel specified by the insertion control signal, in the high speed data passing through the shift register; and low speed data dropping circuits for dropping, in response to the low-frequency clock signal, a low speed data from the shift register. The low frequency clock signal has one enable period corresponding to one of the channels in the frame of the high speed data and is synchronous with at least one of the outputs of the low speed data dropping circuits. The clock signal generating circuit and the shift register are common to both the low speed data insertion control circuits and the low speed data dropping circuits.

By the above construction, the data insertion into one or more of the desired channels at the outputs of the necessary stages of the shift register, and the data dropping from one or more of the outputs of the necessary stages, can be carried out by a single shift register and a single clock signal generating circuit.

DESCRIPTION OF THE PREFERRED EMBODIMENTS

For a better understanding of the present invention, the conventional drop/insert processing circuits will be first described with reference to FIGS. 1 to 6.

Figure 1:
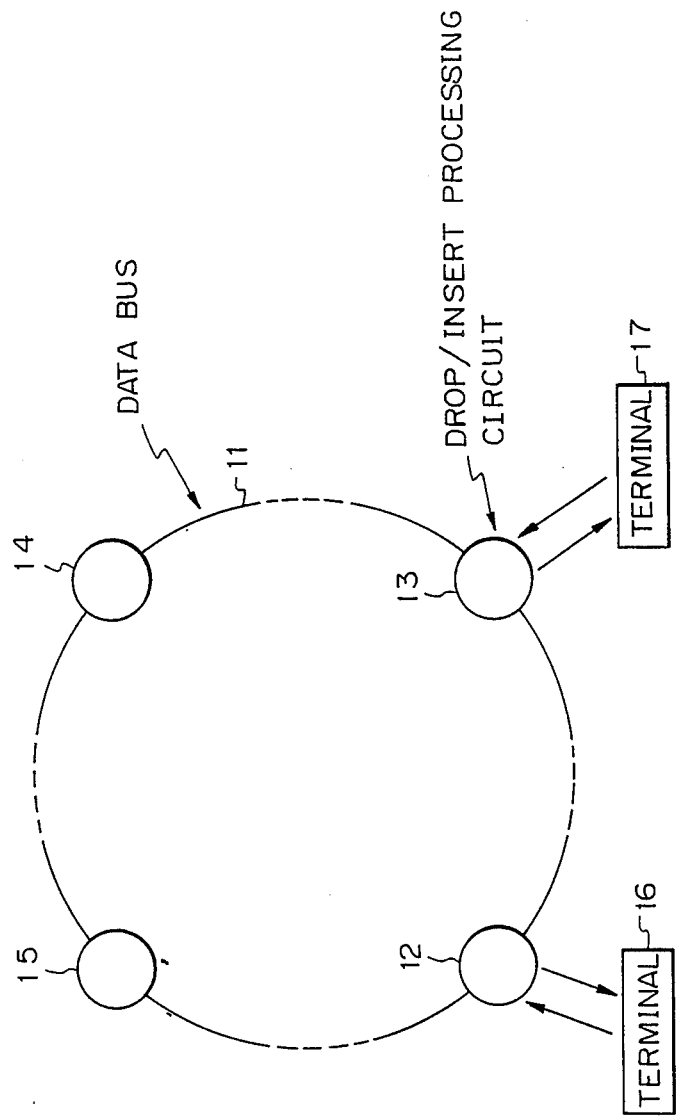
FIG. 1 is a diagram showing an example of a conventional broadband subscriber network of the present invention.

FIG. 1 is a diagram showing an example of a conventional broadband subscriber network used in the field to which the present invention is related.

In the broadband subscriber network such as a local area network (LAN) or a metropolitan area network (MAN), shown as an example in FIG. 1, drop/insert processing circuits 12, 13, 14, and 15 are provided on a data bus 11 in the shape of a loop. In this network, any arbitrary data on a channel from a series of time-division multiplexed signals flowing through the data bus 11 at a high speed must be dropped into the terminals 16, 17, and so forth, or a signal from the terminals 16, 17 and so forth, inserted at any arbitrary channel through the drop/insert processing circuits.

Figure 2:
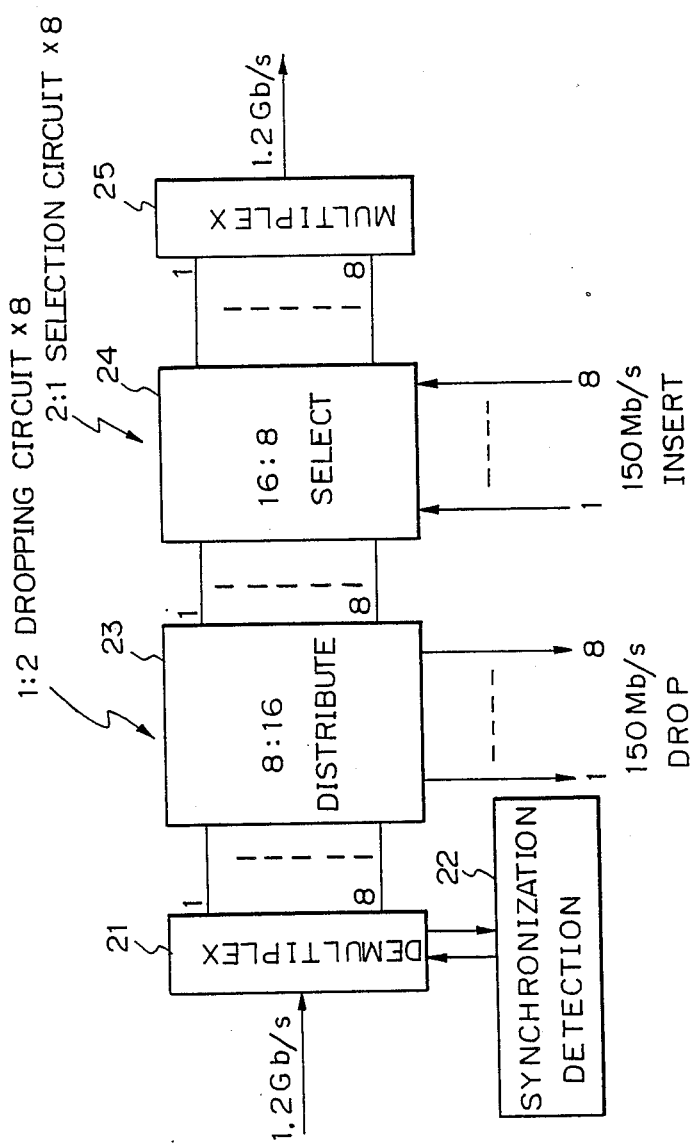
FIG. 2 is a block diagram showing an example of a conventional drop/insert processing circuit.

FIG. 2 is a block diagram showing an example of a conventional drop/insert processing circuit.

In the figure, a parallel type circuit is shown in which a high speed serial data of, for example, 1.2 Gb/s is once separated or demultiplexed in parallel and then multiplexed. Namely, series data of 1.2 Gb/s is converted by a demultiplexing circuit 21 into 8-bits parallel data of 150 Mb/s in response to a low-frequency clock signal generated from a synchronization detecting circuit 22. The low speed parallel data is then input into an 8:16 distributing circuit 23 having eight 1:2 dropping circuits. The distributing circuit 23 receives the 8-bit parallel data and distributes this data into two parts of the 8-bit data through the dropping circuits, and thus the desired channel data is dropped as 8-bit parallel data of 150 Mb/s. The data passed through the distributing circuit 23 is input to a 16:8 selecting circuit 24 consisting of eight 2:1 selecting circuits, wherein one or more of the 8-bit parallel data of 150 Mb/s is inserted at desired channels of the signal passing through the 16:8 selecting circuit 24, and then the outputs of the selecting circuit 21 are multiplexed into high speed data of 1.2 Gb/s by a multiplexer 25.

Figure 3:
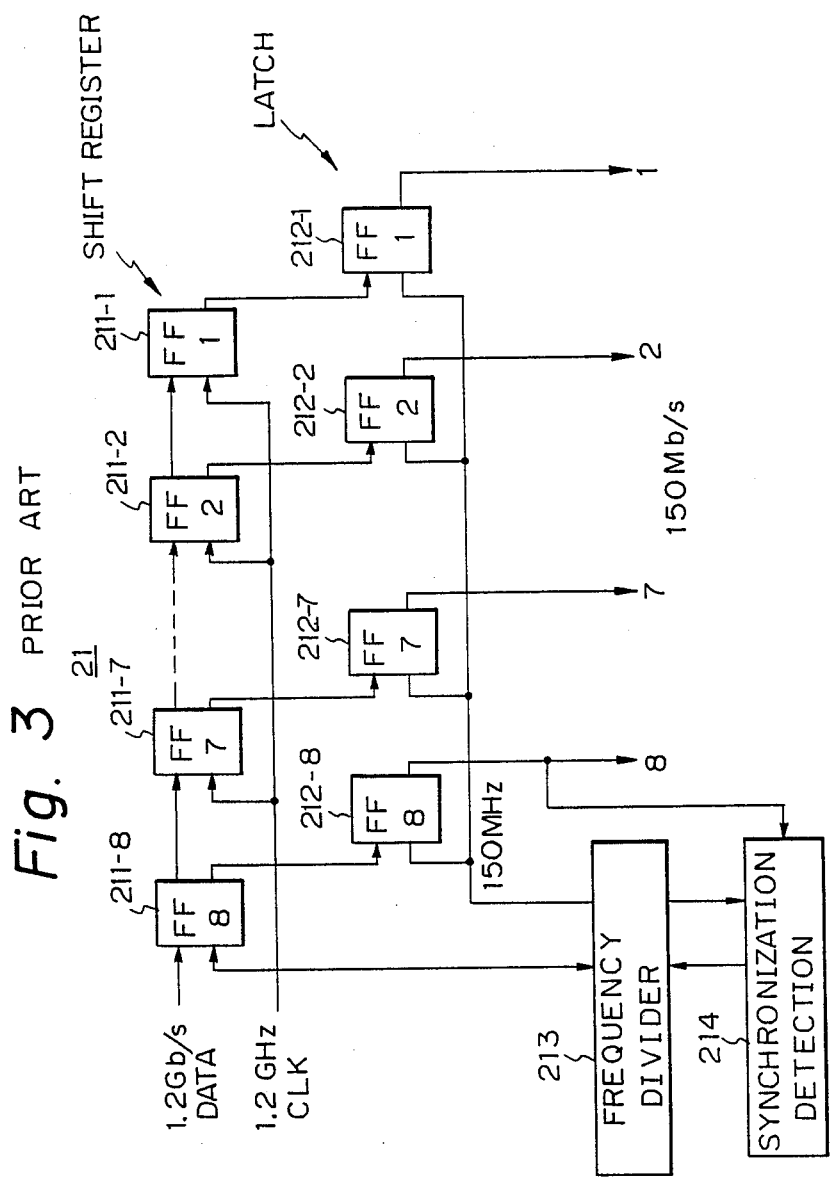
FIG. 3 is a block diagram showing an example of the demultiplexing circuit in the circuit showing in FIG. 2.

FIG. 3 is a block diagram showing an example of the demultiplexing circuit 25 in the circuit shown in FIG. 2.

In the figure, in response to a 1.2 GHz clock signal transmitted from a signal line of the high speed data loop, the input data of 1.2 Gb/s consisting of eight channels is sequentially shifted from flip-flops 211-8 to 211-1, which constitute a shift register and data of the respective channels is obtained at the respective inverted outputs of the flip-flops. The parallel data obtained at the outputs of the flip-flops 211-1 to 211-8 consists of 8-bit parallel data of 150 Mb/s which is latched and then output by flip-flops 212-8 to 212-1 in response to a low frequency clock signal of 150 MHz. The shifted data of 150 Mb/s is sequentially latched at the flip-flops 211-8 to 211-1 and output from the outputs of these flip-flops.

A frequency divider 213 generates a low-frequency clock signal of 150 MHz based on the 1.2 GHz clock signal and the output of a synchronization detecting circuit 214, and the synchronization detecting circuit 214 generates a synchronization detecting signal which is applied to the frequency divider 213, based on the outputs from the flip-flops 212-8 to 212-1 and the output from the frequency divider 213.

Figure 4:
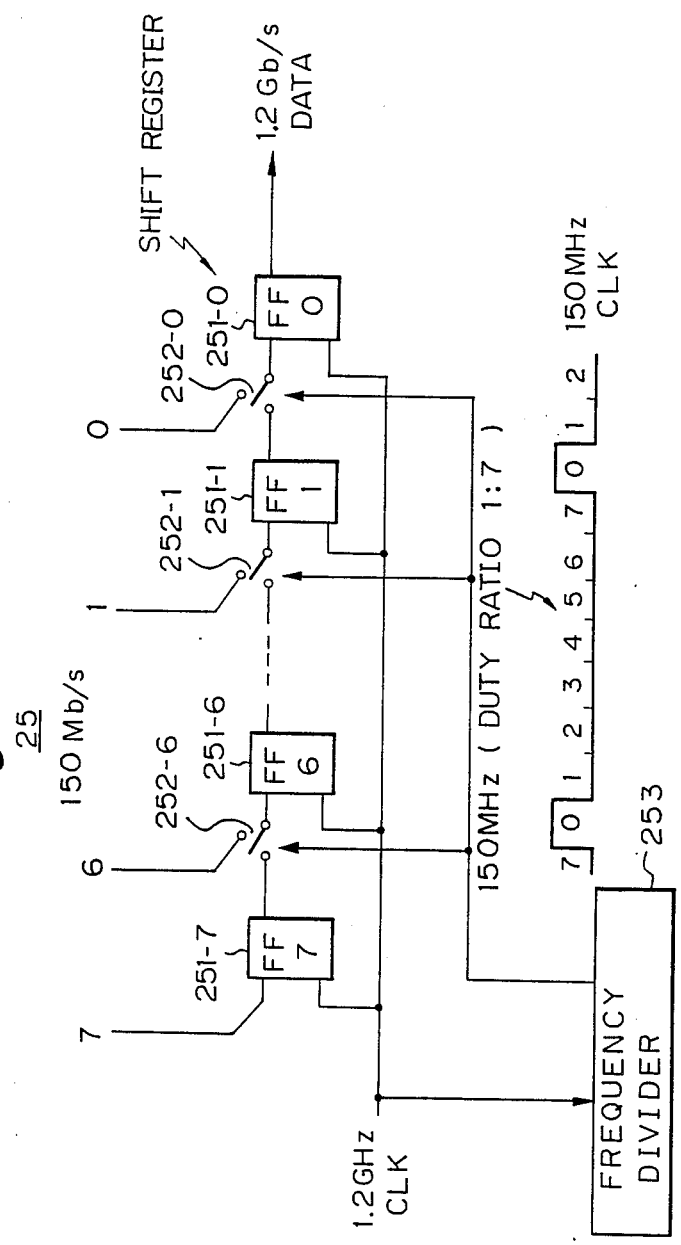
FIG. 4 is a block diagram showing an example of a conventional shift register type multiplexing circuit in the circuit shown in FIG. 2.

FIG. 4 is a block diagram showing a shift register type multiplexer (MUX) 25 as an example of a conventional multiplexing circuit.

As shown in the figure, in response to a clock signal of 150 MHz having a duty ratio of 1:7, and in response to a control signal (not shown in FIG. 4) for selecting one or more of the switches to insert the low-speed data into desired channels, the corresponding one or more switches 252-6 to 252-0 are driven so that the data of 150 Mb/s is latched in the corresponding one or more flip-flops 551-6 to 551-0, and in response to the 1.2 GHz clock signal, the above-mentioned latched data is sequentially shifted. A frequency divider 253 generates the above-mentioned 150 MHz clock signal having a duty ratio of 1:7, based on the 1.2 GHz clock signal.

Figure 5:
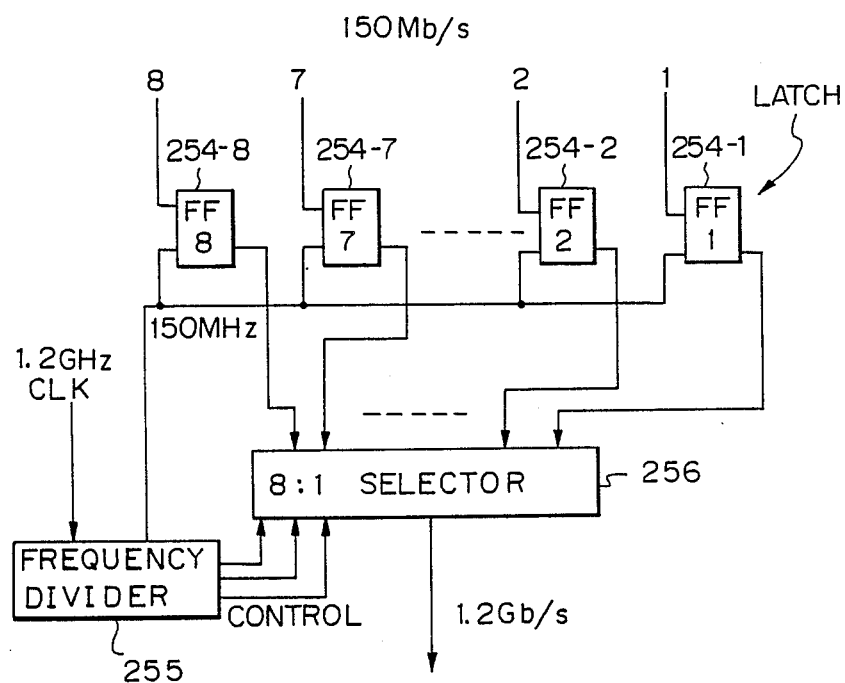
FIG. 5 is a block diagram of a conventional selector type multiplexing circuit.

FIG. 5 is a block diagram showing a selector type MUX as another example of a conventional multiplexing circuit.

As shown in the figure, flip-flops 254-1 to 254-8 latch the data of 150 Mb/s in response to the 150 MHz clock signal. A frequency divider 255 generates the above-mentioned clock signal of 150 MHz based on the 1.2 GHz clock signal, and generates a 3-bit control signal to be applied to a 8:1 selector 256. The 8:1 selector 256 sequentially selects the outputs of the flip-flops 254-8 to 254-1 in response to the above-mentioned control signal, so that data of 1.2 Gb/s is obtained.

Figure 6:
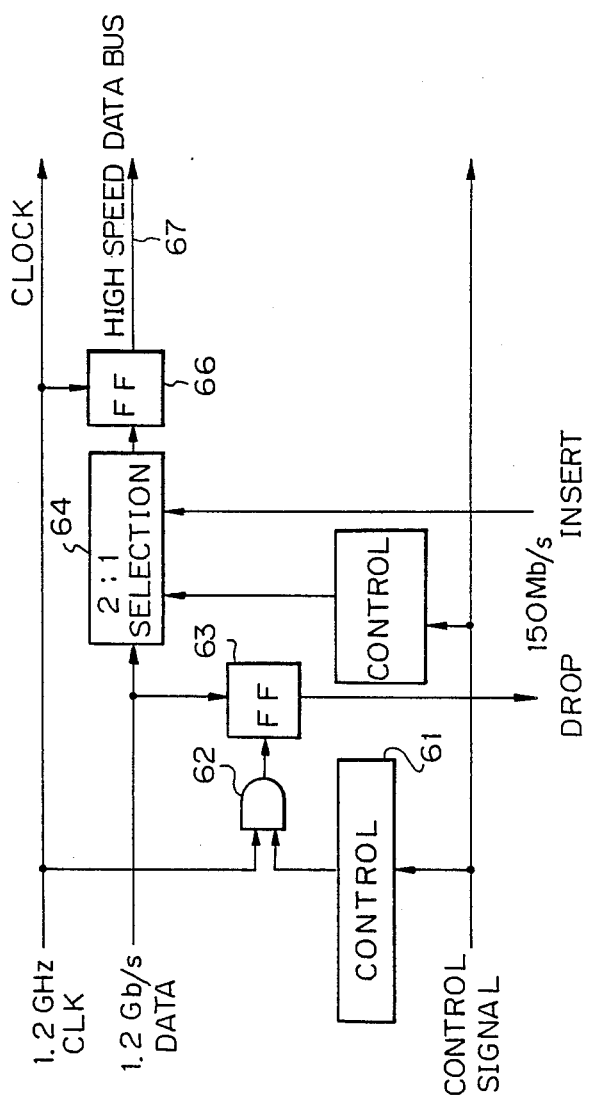
FIG. 6 is a block diagram showing another example of a drop/insert processing circuit used during research carried out to realize the present invention.

FIG. 6 is a block diagram showing another example of a drop/insert processing circuit used during research carried out by the present inventors to realize the present invention.

The figure shows a direct type circuit in which the dropping and inserting of high speed data are directly carried out. A control circuit 61 receives a control signal and generates a signal synchronous with a channel from which data is to be dropped. The signal passes through an AND gate 62 in response to the 1.2 GHz clock signal and is supplied to a flip-flop (FF) 63, and the flip-flop (FF) 63 latches the data of 1.2 GHz at the timings thereof. Accordingly, dropped data of 150 Mb/s is obtained at the output of the flip-flop (FF) 63. Further, a control circuit 65 generates a signal which is synchronous with the channel to which data is to be inserted, and this signal is applied to a 2:1 selecting circuit 64. Accordingly, data is inserted into a desired channel and a flip-flop (FF) 66 outputs high speed data, which is synchronous with the 1.2 GHz clock signal, to a high speed data bus 67.

The problems of the above-described circuits shown in FIGS. 2 to 6 will be now described.

In the conventional circuit shown in FIGS. 2 to 5, high-speed data is once demultiplexed to low-speed data and then, after distribution and selection, the data is again multiplexed. Therefore, too many circuits, such as the demultiplexing circuit 21, the distributing circuit 23, the selecting circuit 24, and the multiplexing circuit 25 must be used, causing the disadvantage of a large circuit scale.

In the circuit shown in FIG. 6, which is a circuit used for research by the present inventors, although the above-mentioned large scale circuit is not necessary, the control signal 1.2 Gb/s must be synchronous with the channel from or to which data is to be dropped or data is to be inserted. Therefore, a disadvantage arises in that it is very difficult to form such a critical control signal, if signal delays due to wiring lengths or circuit constituting elements are taken into consideration.

The embodiments of the present invention will now be described.

Figure 7:
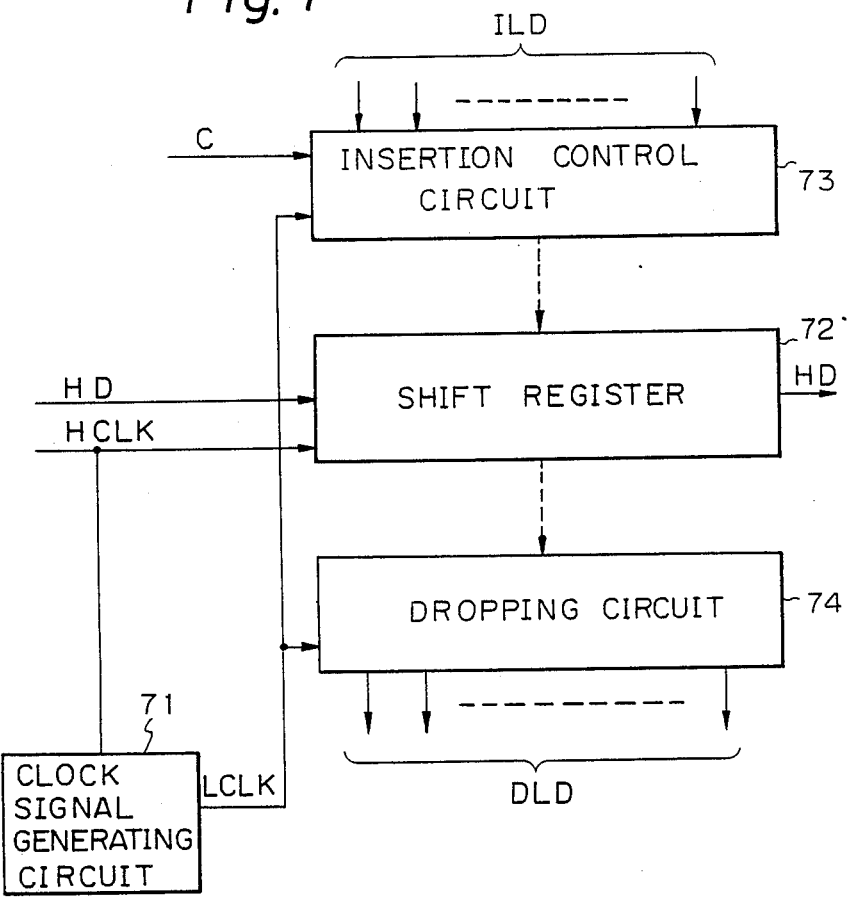
FIG. 7 is a principal block diagram showing the basic construction of the present invention.

FIG. 7 is a principal block diagram of the constitution of the present invention.

In the figure, the drop/insert processing circuit according to the present invention is used for dropping low speed data (DLD) from high speed data (HD) or inserting low speed data (ILD) into high speed data. The high speed data has a frame consisting of a plurality of channels, and each channel is synchronous with a high-frequency clock signal. The drop/insert processing circuit comprises a clock signal generating circuit 71, a shift register 72, a low speed data insertion control circuit 73, and a low speed data dropping circuit 74. The clock signal generating circuit 71 divides the high-frequency clock signal into a low-frequency clock signal; the shift register 72 serially receives and shifts the high speed data in response to the high-frequency clock signal; the low speed data insertion control means 73 inserts, in response to the low-frequency clock signal and a data insertion control signal, the low speed data into a channel, specified by the data insertion control signal, in the high speed data passing through the shift register; and the low speed data dropping circuit 74 drops, in response to the low-frequency clock signal, low speed data from the shift register. The clock signal generating circuit and the shift register are common to both the low speed data insertion control circuit and the low speed data dropping circuit, and therefore, the circuit scale can be reduced and the drop/insert control can be simplified.

Figure 8:
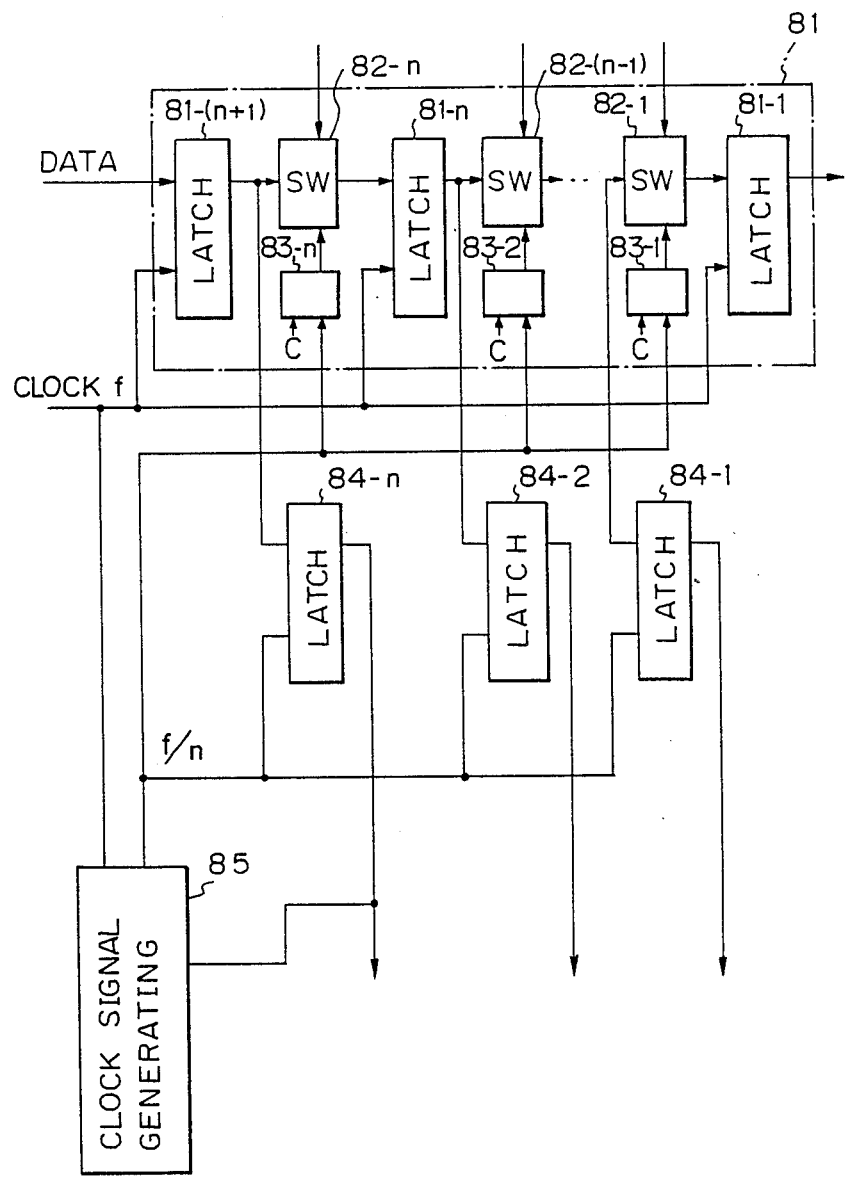
FIG. 8 is a block diagram showing the principle of an embodiment of the present invention.

FIG. 8 is a block diagram showing the principle of an embodiment of the present invention.

In the figure, the drop/insert processing circuit includes a shift register 81. The shift register 81 comprises (n+1) first latching circuits 81-1, 81-2, ... and 81-(n+1), for shifting data of f bits/s in response to a clock signal having a frequency f, n data inserting circuits 82-1, 82-2, ... and 82-n each connected between two adjacent first latching circuits, and n data insertion control switches 83-1, 83-2, ... and 83-n each having an output connected to a control input of the corresponding one of the data inserting switches 82-1, 82-2, ... and 82-n. The drop/insert processing circuit further includes n second latching circuits 84-1, 84-2, and 84-n for incorporating, in response to a second clock signal having a frequency f/n and a duty ratio of 1:(n−1), the outputs of the corresponding first latching circuits 81-2 to 82-(n+1). Note that the final stage latching circuit 81-1 is not connected to a second latching circuit and merely outputs serial high speed data. The drop/insert processing circuit further includes a clock signal generating circuit 85 for dividing the first clock signal to generate a second clock signal which is synchronous with at least one of the outputs of the second latching circuits 84-1 to 84-n. The second clock signal has one enable period corresponding to one of the channels in the frame of the high speed data. Each of the data insertion control switches 83-1 to 83-n has an end functioning as a control output and has another input for receiving the second clock signal, to determine whether or not data should be inserted. The second clock signal is supplied through a data insertion control switch, which is in the ON state, to a data inserting circuit corresponding to the second clock signal so that the bit corresponding to the data of f/n bits/s is inserted into the corresponding latching circuit, and data of f/n sec is dropped from the second latching circuits.

By applying the low-frequency second clock signal to both the second latching circuits 84-1 to 84-n constructing the demultiplexing circuit and to the data insertion selecting switches 82-1 to 82-n through the control circuits 83-1 to 83-n, an integrated circuit which can be used for both multiplexing and demultiplexing can be realized, and the conventionally required distributing circuit and selecting circuit become unnecessary.

Figure 9:
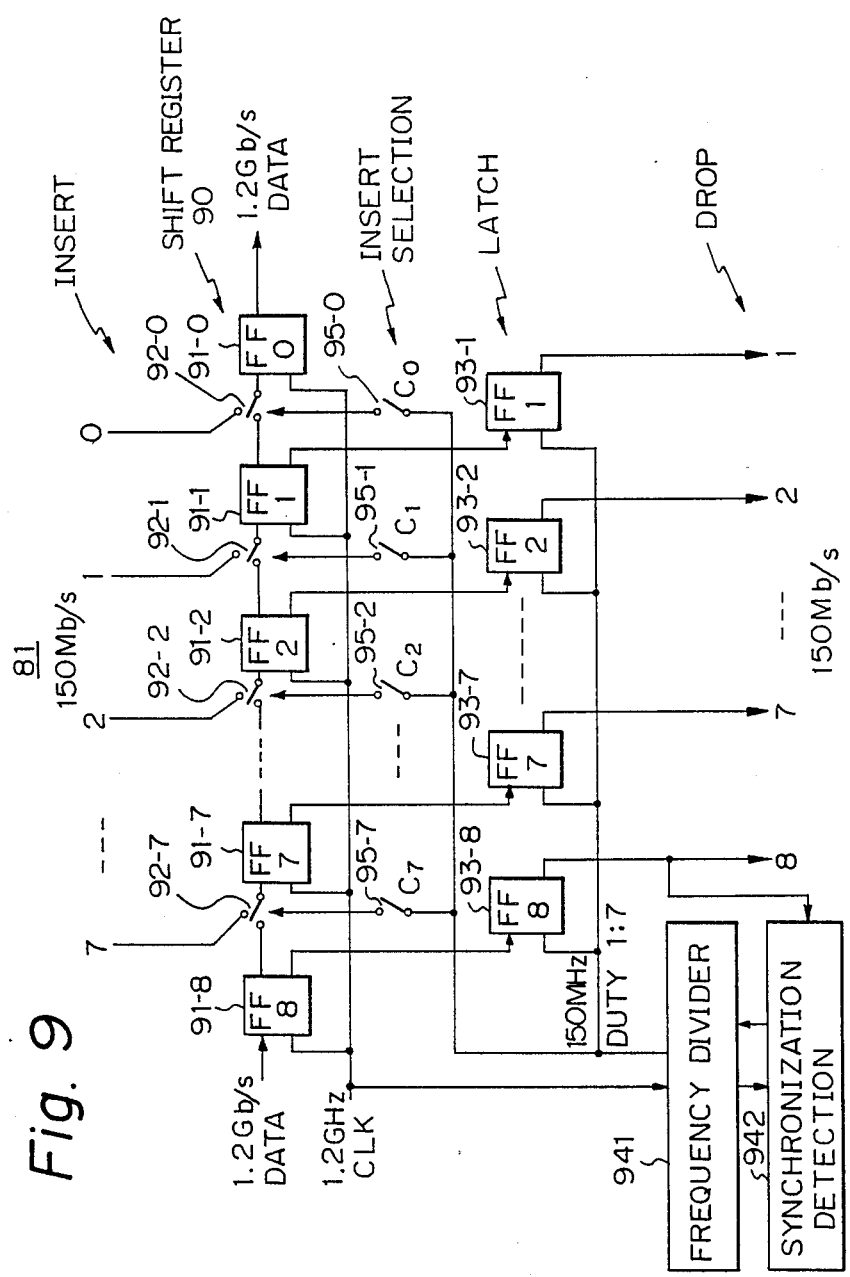
FIG. 9 is a block diagram showing a practical example of the present invention.

FIG. 9 is a block diagram showing a practical example of the above described embodiment.

In the figure, a shift register type drop/insert processing circuit is illustrated in which 91-0 to 91-8 are flip-flops, which constitute a shift register 90 for shifting data of 1.2 Gb/s in response to the 1.2 GHz clock signal. Data inserting switches 92-0 to 92-7 are connected between two adjacent flip-flops 91-0 to 91-8. Flip-flops 93-1 to 93-8 latch the inverted outputs of the flip-flops 91-1 to 92-8 in response to a clock signal of 150 MHz with a duty ratio of 1:7. A frequency divider 941 generates the above-mentioned 150 MHz clock signal based on both the 1.2 GHz clock signal and the output of a synchronization detecting circuit 942. As the frequency divider 941, a prescaler may be employed. The synchronization detecting circuit 942 establishes a synchronization of the phase of the 150 MHz signal obtained by dividing the 1.2 GHz with the rising of the output of the flip-flop 93-8. Each of the data insertion selecting switches 25-0 to 25-7 has one end for receiving the above-mentioned 150 MHz clock signal and another end as a control input of each of the data inserting switches 92-0 to 92-7.

By the above-described construction, dropped data of 150 Mb/s is obtained at the outputs of the flip-flops 93-1 to 93-8.

When data is to be inserted, the data insertion control switch corresponding to the desired channel, for example, 95-1, is previously closed in response to a control signal. Then, through the control switch, the 150 MHz clock signal is given as a control signal to the corresponding data inserting switch, for example, 92-1, whereby the data inserting switch 92-1 is turned so that the data input terminal of the flip-flop 91-1 receives the desired bit of the inserting data of 150 Mb/s, in place of the output of the pre-stage flip-flop 21-2. Accordingly, the data is inserted into the desired channel and is shifted in response to the 1.2 GHz clock signal, so that the data of 1.2 Gb/s is obtained at the output of the flip-flop 21-0.

Figure 10:
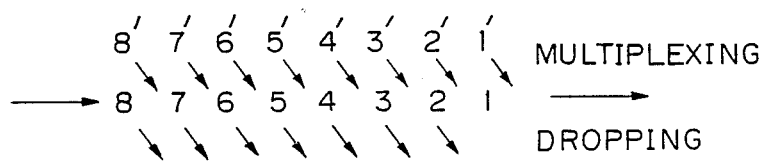
FIG. 10 is a timing chart of the dropping and the inserting processes in the circuit shown in FIG. 9.

FIG. 10 is a timing chart of the multiplexing and the demultiplexing process in the circuit shown in FIG. 9.

In the figure, the data 1, 2, 3, ..., and 8, which are sequentially shifted through the shift register 90 in response to the 1.2 GHz clock signal, are demultiplexed by a serial-to-parallel conversion at each rise timing of the 150 MHz clock signal, and immediately before the time of each of the shifts through the shift register, the desired data in the data to be inserted is inserted in response to the rise timing of the 150 MHz clock signal.

Figure 11:
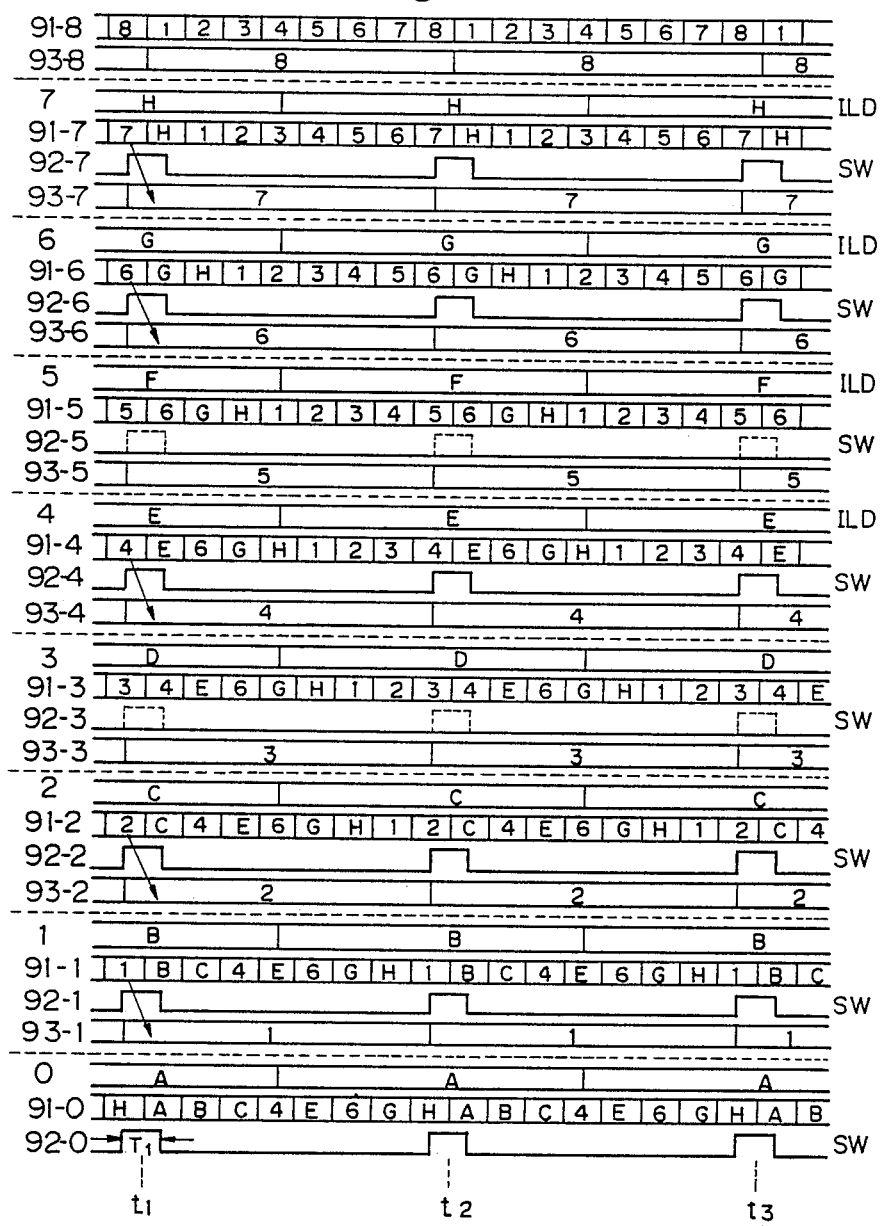
FIG. 11 is a detailed timing chart of the inserting and dropping process in the circuit shown in FIG. 9; and, FIG. 12 is a block diagram of a second embodiment of the present invention.

FIG. 11 is a timing chart explaining in more detail the data insertion and data dropping process in the circuit shown in FIG. 9.

In the figure, the high speed data of 1.2 GHz input to the flip-flop 91-8 is represented as a cyclic data of 1, 2, ... and 8 consisting of one frame. The low speed data 1', 2', ... and 7' of 150 MHz to be inserted as shown in FIG. 10 are represented as A, B, C, D, E, F, G, and H, respectively. At times $t_1$, $t_2$, and $t_3$, the low frequency clock signal of 150 MHz is applied, in this example, to the data inserting switches 92-7, 92-6, 92-4, 92-2, and 92-1, as illustrated by solid-line pulses. The switches 92-5 and 92-3 do not receive the low frequency clock signal in this example, as illustrated by dotted-line pulses, and the control of the application of the low frequency clock signal to the switches 92-0 to 92-7 is carried out by the control switches 95-0 to 95-7, respectively. The low frequency clock signal has a duty ratio of 1:7, i.e., the low frequency clock signal has a high level of one channel period of the high speed data. The high level enable period $T_1$ consists of a preceding half period corresponding in time to the last channel of the frame of the input high speed data and a latter half period corresponding in time to the frame of the input high speed data.

As a result of the application of the low frequency clock signal to the desired data inserting switches as mentioned above, the low speed data of A, B, C, E, G, and H are inserted, in response to the last half period of the low frequency clock signal, to the respective channels corresponding to the clock signal in the high speed data, as illustrated by circles in the figure. The high speed data including the inserted data is shifted through the shift register, and accordingly, high speed data of 1.2 GHz, in which each frame consists of the data H, A, B, C, 4, E, 6, and G, is output to the high speed data loop from the final stage flip-flop 91-0.

On the other hand, the low frequency clock signal of 150 MHz is supplied to all of the second flip-flops 93-1 to 93-8, and therefore, in response to each preceding half period of the low frequency clock signal, the corresponding channel data 1, 2, 3, 4, 5, 6, 7, and 8 is latched by the flip-flops 93-1 to 93-8, respectively. The latched data is dropped in parallel from the inverted outputs of the second flip-flops 93-1 to 93-8 as low speed data of 150 Mb/s.

In the embodiment described with reference to FIGS. 9 to 11, since the shift register part and the frequency dividing part are commonly used in the demultiplexing circuit and the multiplexing circuit by providing a special low frequency clock signal, an integrated circuit which can be used for both the multiplexing and the demultiplexing is realized, whereby the conventionally required distributing circuit and the selecting circuit become unnecessary, and thus a general purpose circuit having four modes, i.e., multiplication, demultiplication, multiplication/demultiplication, and dropping/inserting, is provided and, therefore, the circuit is simplified.

As an example, conventionally, when a multiplexing circuit of a variable shift register type with 2 to 16 channels, a demultiplexing circuit of the same type, a 16:32 dropping circuit and a 32:16 selecting circuit are constructed in the conventional way, the respective circuits require 570 gates, 770 gates, 30 gates, and 100 gates (note that the input buffer is not included). In contrast, when constructed as a shift register type drop-/insert processing circuit as in the above-mentioned embodiment, only 900 gates are necessary and a reduction in scale of about 40% is realized.

Figure 12:
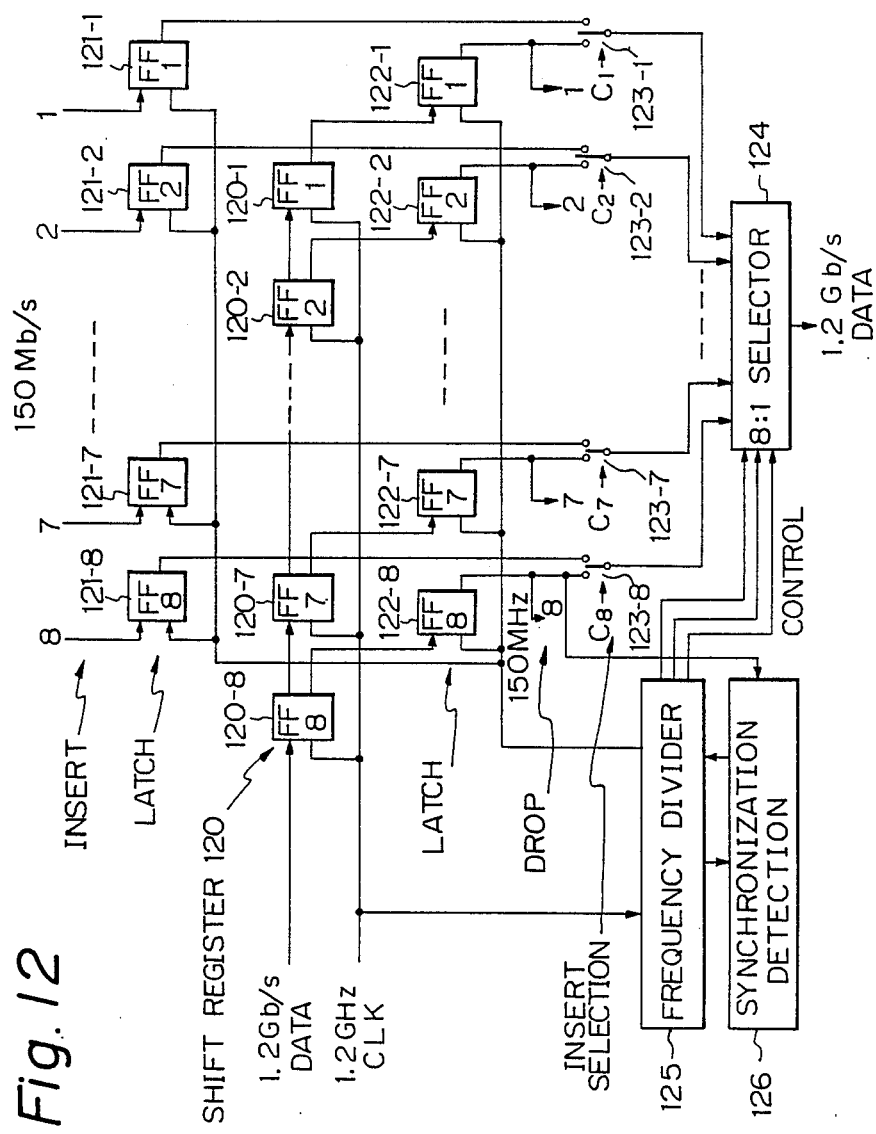

FIG. 12 is a block diagram showing a second embodiment of the present invention.

In the figure, a selector type drop/insert processing circuit is illustrated, wherein a shift register 120 includes flip-flops 120-1 to 120-8 for shifting data in response to the 1.2 GHz clock signal; flip-flops 122-1 to 122-8 respectively incorporate the outputs of the flip-flops 120-1 to 120-8 in response to the clock signal of 150 MHz and having a duty ratio of 1:8; flip-flops 121-1 to 121-8 incorporate the inserting parallel data of 150 Mb/s in response to the above-mentioned 150 MHz clock signal; data insertion selecting switches 123-1 to 123-8 selectively output either of the outputs of the flip-flops 122-1 to 122-8 and the outputs of the flip-flops 121-1 to 121-8; and frequency divider 125 forms the above-mentioned 150 MHz clock signal based on both the 1.2 GHz clock signal and the output of the synchronization detecting circuit 126. The synchronization detecting circuit 126 synchronizes the phase of the 150 MHz signal, which is obtained by dividing the 1.2 GHz, with the rising of the inverted output of the flip-flop 122-8 and generates a 3-bit control signal to be applied to the 8:1 selector 35.

The above-described construction enables dropped data of 150 Mb/s to be obtained at the inverted outputs of the flip-flops 122-1 to 122-8.

When data is to be inserted, it is sufficient that the data insertion selecting switch, for example, 123-1, corresponding to the desired channel is switched so that, in place of the output of the flip-flop 122-1, the inverted output of the flip-flop 121-1 is input to the 8:1 selector 124. The 8:1 selector 124 cyclically selects the output of the switches 123-1 to 123-8 by using the control signal as an address signal, so that the data of 1.2 Gb/s can be obtained at the output thereof.

Also in the embodiment shown in FIG. 12, the frequency divider part is commonly used in the demultiplexing circuit and the multiplexing circuit part, whereby the conventionally required distributing circuit and selecting circuit become unnecessary, and thus the circuit is simplified.

As described above, according to the present invention, in a drop/insert processing circuit in a broadband subscriber network, by commonly using a part of the circuit in the dropping circuit and in the inserting circuit, the conventionally required distributing circuit and the selecting circuit become unnecessary so that the drop/insert processing circuit can be formed as one body and the circuit scale can be greatly reduced. Further, the low frequency clock signal can be easily generated synchronously with the rise of the data dropping latching circuit, so that the control is simplified.

We claim:

1. A drop/insert processing circuit for dropping low speed data from high speed data or inserting low speed data into high speed data, said high speed data having a frame consisting of a plurality of channels, each channel being synchronous with a high-frequency clock signal, said drop/insert processing circuit comprising:
   a clock signal generating circuit for dividing said high-frequency clock signal into a low-frequency clock signal;
   a shift register for serially receiving and shifting high speed data in response to said high-frequency clock signal;
   low speed data insertion control means for inserting, in response to said low-frequency clock signal and a data insertion control signal, low speed data into a channel, specified by said data insertion control signal, in said high speed data passing through said shift register; and
   low speed data dropping means, having a plurality of outputs, for dropping, in response to said low-frequency clock signal, low speed data from the shift register;
   said low-frequency clock signal having one enable period corresponding to one of said channels in the frame of said high speed data and being synchronous with at least one of the outputs of said low speed data dropping means;
   wherein, said clock signal generating circuit and said shift register are used in common by both said low speed data insertion control means and said low speed data dropping means.

2. A drop/insertion processing circuit as claimed in claim 1, wherein
   said shift register comprises a plurality of first latching circuits, for serially receiving and shifting high speed data in response to said high-frequency clock signal;
   said low speed data insertion control means comprises:
     a plurality of control circuits for passing said low-frequency clock signal in response to said data insertion control signal, and
     a plurality of low speed data inserting switches each connected to a corresponding one of said control circuits and connected between two adjacent first latching circuits, to selectively output either said high speed data and said low speed data in response to said low-frequency clock signal passed through said control circuit; and
   said low speed data dropping means comprises a plurality of second latching circuits, respectively connected to corresponding outputs of said first latching circuits, for incorporating and outputting the corresponding one of outputs of said first latching circuits in response to said low-frequency clock signal, in order to drop low speed data.

3. A drop/insert processing circuit as claimed in claim 2, wherein each of said low speed data inserting switches comprises a first input terminal for receiving high speed data output from a preceding one of the two adjacent first latching circuits, a second input terminal for receiving one bit of parallel data of said low speed data, and an output terminal for selectively outputting either of said high speed data and said low speed data in response to said low-frequency clock signal passed through the corresponding one of said control circuits, whereby said low speed data is inserted into the channel specified by said data insertion control signal.

4. A drop/insert processing circuit as claimed in claim 2, wherein said high speed data has a bit rate of f bits/s and said high-frequency clock signal has a frequency f.

5. A drop/insert processing circuit as claimed in claim 4, wherein n of said second latching circuits are contained in said low speed data dropping means, said low speed data has a bit rate of f bits/n and said low-frequency clock signal has a frequency of f/n.

6. A drop/insert processing circuit as claimed in claim 5, wherein said low-frequency clock signal has a duty ratio of 1:(n−1).

7. A drop/insert processing circuit as claimed in claim 6, wherein n+1 of said first latching circuits are contained in said shift register.

8. A drop/insert processing circuit as claimed in claim 7, wherein said second latching circuits respectively have input terminals for receiving outputs of said first latching circuits, except for a final stage of the first latching circuits.

9. A drop/insert processing circuit as claimed in claim 2, wherein each of said first latching circuits except for the final stage latching circuit has two output terminals for providing shifted high speed data, one of said output terminals being connected to said first input terminal of said low speed data inserting means, and the other of said output terminals being connected to said input of a corresponding second latching circuit.

10. A drop/insert processing circuit as claimed in claim 9, wherein the final stage of said first latching circuits has a single output for providing output high speed data.

11. A drop/insert processing circuit as claimed in claim 1, wherein said clock signal generating circuit comprises a frequency divider for dividing an input high-frequency clock signal into a low-frequency clock signal, and a synchronization detecting circuit for establishing a synchronization between said low frequency clock signal and dropped low speed data.

12. A drop/insert processing circuit, comprising:
a shift register including (n+1) first latching circuits, for shifting data of f bits/s in response to a clock signal having a frequency f;
n data inserting circuits each connected between two adjacent first latching circuits;
n second latching circuits, corresponding to said data inserting circuits, for incorporating, in response to a second clock signal having a frequency of f/n and having a duty ratio of 1:(n−1), outputs of all of said first latching circuits in said shift register up to a last stage of said latching circuits;
a clock signal generating circuit for dividing said first clock signal and for generating a second clock signal which is synchronous with the output of at least one of said second latching circuits; and
n data insertion selecting switches, corresponding to said data inserting circuits, each having an input terminal functioning as a control input and having another input for receiving said second clock signal to determine whether or not data should be inserted;
said second clock signal being supplied through one of said data insertion selecting switches, which is in the ON state, to a corresponding one of said data inserting circuits so that a bit corresponding to the data of f/n bits/s is inserted into a corresponding second latching circuit, and
data of f/n bits/s is dropped from said second latching circuits.

13. A drop/insert processing circuit as claimed in claim 1, wherein
said shift register comprises a plurality of first latching circuits having outputs, for serially receiving and shifting high speed data in response to said high-frequency clock signal;
said low speed data insertion control means comprises;
a plurality of second latching circuits, having outputs, for latching, at the outputs, input low speed data in parallel in response to said low-frequency clock signal,
a plurality of third latching circuits for respectively latching the outputs of said first latching circuits, each having an output,
a plurality of low speed data inserting switches, corresponding to said first, second and third latching circuits, each having a first input terminal connected to the output of a corresponding one of said second latching circuits, a second input terminal connected to the output of a corresponding one of said third latching circuits, and an output terminal for outputting, in response to said data insertion control signal, one of the outputs of the corresponding one of said first and second latching circuits, and
a multiplexing circuit having a plurality of input terminals respectively connected to the output terminal of each of said low speed data inserting switches, for multiplexing input data to obtain output high speed data; and
said low speed data dropping means comprises said third latching circuits, the dropped signal being obtained at the output terminals thereof.

14. A drop/insert processing circuit as claimed in claim 13, wherein said clock signal generating circuit comprises;
a frequency divider for dividing an input high-frequency clock signal into a low-frequency clock signal, and
a synchronization detecting circuit for establishing synchronization between said low-frequency clock signal and dropped low speed data.

15. A drop/insert processing circuit, comprising:
a shift register, including n first latching circuits, for shifting data of f bit/s in response to a first clock signal having a frequency f to produce outputs;
n second latching circuits, having outputs, for incorporating at the outputs, in response to a second clock signal having a frequency of f/n and a duty ratio of 1:(n−1), the outputs of all of the first latching circuits in said shift register;

n third latching circuits, having outputs, for incorporating at the outputs parallel data of f/n bits/sec in response to said second clock signal;

data insertion selecting switches for selecting the outputs of either said second latching circuits or the outputs of said third latching circuits to produce outputs;

a clock signal generating circuit for dividing said first clock signal, for generating said second clock signal which is synchronous with at least one of the outputs of said second latching circuits and for generating an address signal for sequentially selecting the outputs of said data insertion selecting switches with a frequency f; and an n:1 selector for sequentially selecting and outputting the outputs of said data insertion selecting switches in response to the address signal from said clock signal generating circuit;

wherein dropped data of f/n bits/sec is obtained from the outputs of said second latching circuits and multiplexed data of f/n bits/sec is obtained from the output of said n:1 selector.

* * * * *